United States Patent
Chou et al.

(10) Patent No.: US 9,009,449 B2
(45) Date of Patent: Apr. 14, 2015

(54) REDUCING POWER CONSUMPTION AND RESOURCE UTILIZATION DURING MISS LOOKAHEAD

(75) Inventors: Yuan C. Chou, Los Gatos, CA (US); Eric W. Mahurin, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 667 days.

(21) Appl. No.: 13/293,733

(22) Filed: Nov. 10, 2011

(65) Prior Publication Data

US 2013/0124829 A1 May 16, 2013

(51) Int. Cl.
*G06F 9/38* (2006.01)
*G06F 9/30* (2006.01)
*G06F 12/00* (2006.01)
*G06F 1/32* (2006.01)

(52) U.S. Cl.
CPC .......... *G06F 9/3842* (2013.01); *G06F 9/30189* (2013.01); *G06F 9/3851* (2013.01); *G06F 12/00* (2013.01); *G06F 9/30127* (2013.01); *G06F 9/383* (2013.01); *G06F 9/3838* (2013.01); *G06F 9/384* (2013.01); *G06F 9/3859* (2013.01); *G06F 9/3863* (2013.01); *G06F 1/3275* (2013.01)

(58) Field of Classification Search
CPC combination set(s) only.
See application file for complete search history.

(56) References Cited

U.S. PATENT DOCUMENTS

| | | | |
|---|---|---|---|
| 6,701,414 B2 * | 3/2004 | Abdallah et al. | 711/137 |
| 7,487,296 B1 * | 2/2009 | Iacobovici et al. | 711/137 |
| 8,683,129 B2 * | 3/2014 | Ono et al. | 711/122 |
| 2002/0087802 A1 * | 7/2002 | Al-Dajani et al. | 711/137 |
| 2003/0105942 A1 * | 6/2003 | Damron et al. | 712/216 |
| 2005/0251668 A1 * | 11/2005 | Chaudhry et al. | 712/235 |
| 2007/0101105 A1 * | 5/2007 | Diefendorff | 712/225 |
| 2008/0091928 A1 * | 4/2008 | Eickemeyer et al. | 712/234 |
| 2010/0262750 A1 * | 10/2010 | Deshpande et al. | 711/3 |

* cited by examiner

*Primary Examiner* — Eric Coleman
(74) *Attorney, Agent, or Firm* — Park, Vaughan, Fleming & Dowler LLP

(57) ABSTRACT

A system that executes program instructions on a processor is described. During a normal-execution mode, the system issues instructions for execution in program order. Upon encountering an unresolved data dependency during execution of an instruction, the system speculatively executes subsequent instructions in a lookahead mode to prefetch future loads. While executing in the lookahead mode, if the processor determines that the lookahead mode is unlikely to uncover any additional outer-level cache misses, the system terminates the lookahead mode. Then, after the unresolved data dependency is resolved, the system recommences execution in the normal-execution mode from the instruction that triggered the lookahead mode.

19 Claims, 6 Drawing Sheets

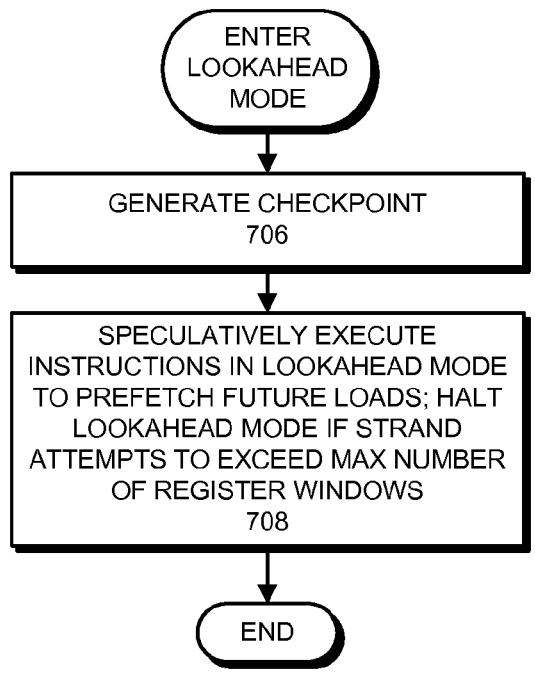
FIG. 7
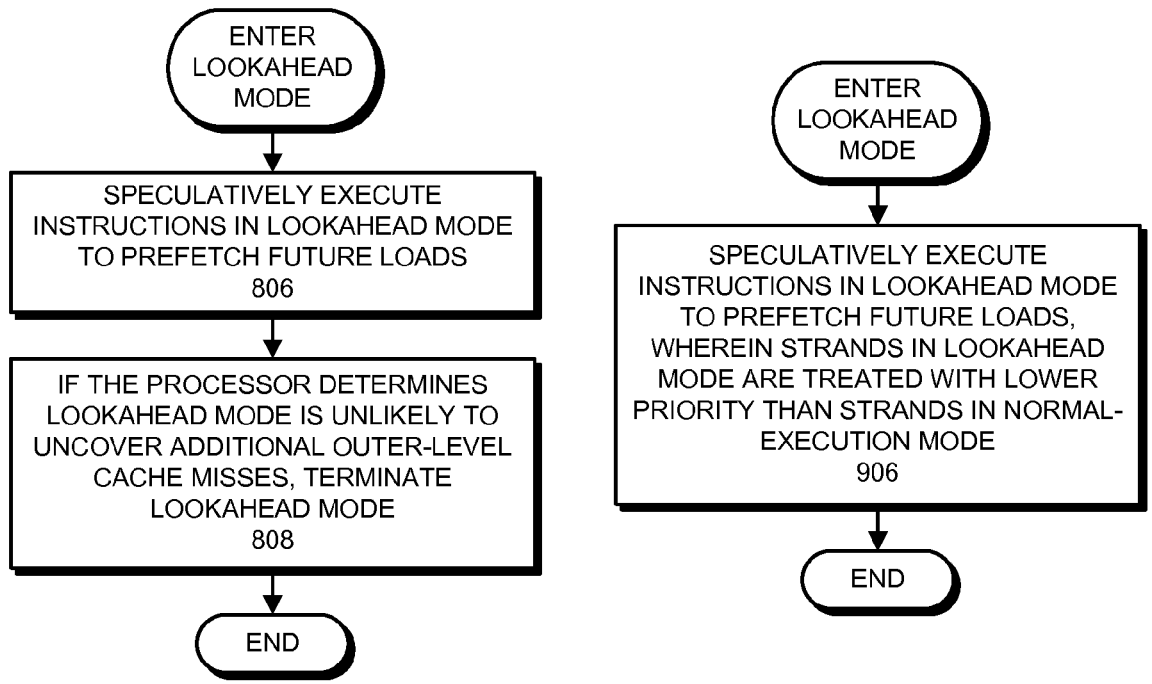
FIG. 8
FIG. 9

REDUCING POWER CONSUMPTION AND RESOURCE UTILIZATION DURING MISS LOOKAHEAD

RELATED APPLICATION

The subject matter of this application is related to the subject matter in a co-pending non-provisional application by the same inventors as the instant application and filed on the same day as the instant application entitled, "Reducing Hardware Costs for Supporting Miss Lookahead," having U.S. Pub. no. 2013/0124828, and filed on the same day as the instant application.

BACKGROUND

1. Field

The disclosed embodiments relate to techniques for improving the performance of computer systems. More specifically, the disclosed embodiments relate to a method and apparatus for reducing hardware costs involved in supporting a lookahead mode, which occurs when a strand encounters a long-latency event and continues executing to generate prefetches without waiting for the long-latency event to complete.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is creating significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can reduce the number of memory accesses that are performed. However, when a memory reference, such as a load operation, generates a cache miss, the subsequent access to level-two cache, level-three cache or main memory can require hundreds of clock cycles to complete, during which time the processor is typically idle, performing no useful work.

The "miss-lookahead" technique has been developed to improve the performance of microprocessors when running applications that encounter such long-latency events (e.g., outermost-level cache misses). In the miss-lookahead technique, a processor transitions a strand (e.g., a hardware thread) from a normal-operating mode to a lookahead mode when that strand encounters a long-latency event, such as a cache miss. As part of the transition, the system takes a checkpoint of the processor state of the strand. In lookahead mode, the processor executes the same code as in normal-operating mode but converts outermost-level cache misses into prefetches and converts instructions which are dependent on the data of these cache misses into no-ops.

When the long-latency event that triggered the entry into lookahead mode completes, the strand exits lookahead mode and resumes execution in normal-operating mode from the instruction that triggered the long-latency event. Note that the strand's architectural register state is modified as instructions are retired during lookahead mode. However, this strand's architectural state is restored back to the checkpointed state prior to resuming execution in the normal-operating mode.

The miss-lookahead technique can significantly improve processor performance because it can effectively perform instruction and data prefetching for the lookahead strand. However, the miss-lookahead technique has a number of drawbacks. (1) As described above, a conventional miss-lookahead technique involves taking a checkpoint of the processor state prior to entering lookahead mode. However, supporting this checkpointing operation can be expensive in terms of hardware costs, especially for processor architectures with a large number of architectural registers (e.g., register windows). Moreover, highly multi-threaded processors potentially require many concurrent checkpoints. (2) Also, the miss-lookahead technique consumes additional power because the lookahead instructions must eventually be re-executed non-speculatively. (3)

Moreover, the miss-lookahead technique can take hardware resources away from other strands that are sharing the same hardware resources as the lookahead strand, thereby slowing those other strands and ultimately affecting processor performance.

Hence, it is desirable to be able to reduce or eliminate the negative effects of the above-described drawbacks in a system that supports miss-lookahead mode.

SUMMARY

The disclosed embodiments relate to a system that executes program instructions on a processor. During a normal-execution mode, the system issues instructions for execution in program order. Upon encountering an unresolved data dependency during execution of an instruction, the system speculatively executes subsequent instructions in a lookahead mode to prefetch future loads, stores and instructions. When an instruction retires during the lookahead mode, a working register which serves as a destination register for the instruction is not copied to a corresponding architectural register. Instead the architectural register is marked as invalid. Note that by not updating architectural registers during lookahead mode, the system eliminates the need to checkpoint the architectural registers prior to entering lookahead mode.

In some embodiments, when an instruction reads an architectural register which is marked invalid during the lookahead mode, the instruction is converted to a no-op.

In some embodiments, when an instruction retires during the lookahead mode, a working register which serves as a destination register for the instruction is not de-allocated right away, but is instead de-allocated at a later time when a strand that is not operating in lookahead mode requires a working register and the working register file is full. Note that the architectural register is marked as invalid when the working register is de-allocated.

In some embodiments, when the unresolved data dependency that originally caused the system to move out of normal-execution mode is finally resolved, the system resumes execution in the normal-execution mode from the instruction that originally encountered the unresolved data dependency. Moreover, resuming execution in the normal-execution mode involves clearing invalid marks from the architectural registers.

In some embodiments, the unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

In another embodiment, upon encountering an unresolved data dependency during execution of an instruction during a normal-execution mode, the system generates a checkpoint that can subsequently be used to return execution of the program to the point of the instruction. Note that this checkpoint excludes floating-point registers, which reduces the size of the checkpoint. Next, the system speculatively executes subsequent instructions in a lookahead mode to prefetch future loads. During the lookahead mode, when an instruction updates a floating-point register, the instruction is not allowed to update the architectural floating-point register when it commits. Also, when an instruction reads a floating-point register during the lookahead mode, the instruction is converted to a no-op.

In another embodiment, upon encountering an unresolved data dependency during execution of an instruction during a normal-execution mode of a current strand, the system determines whether a maximum number of strands are presently executing in a lookahead mode. If so, the system does not allow the current strand to enter the lookahead mode. Otherwise, the system allows the current strand to enter the lookahead mode.

In another embodiment, upon encountering an unresolved data dependency during execution of an instruction during the normal-execution mode, the system generates a checkpoint that can subsequently be used to return execution of the program to the point of the instruction. In this embodiment, generating the checkpoint involves saving an architectural state of the strand to a system memory instead of a dedicated hardware structure. Next, the system speculatively executes subsequent instructions in a lookahead mode to prefetch future loads.

In another embodiment, while executing in the lookahead mode, the system imposes a limit on the number of register windows the strand can use, wherein when the limit is reached and the strand requires a new register window, lookahead mode is halted for the strand.

In another embodiment, while executing in the lookahead mode, if the processor determines that the lookahead mode is unlikely to uncover any additional outer-level cache misses, the system terminates the lookahead mode. Then, after the unresolved data dependency is resolved, the system recommences execution in the normal-execution mode from the instruction that triggered the lookahead mode.

In some embodiments, the system determines that the lookahead mode is unlikely to uncover an additional outer-level cache miss after the lookahead mode uncovers the same number of cache misses as were uncovered during a previous lookahead mode which originated from the same triggering instruction. In these embodiments, the processor can use a program counter for the triggering instruction to perform a table lookup to determine the number of cache misses which were uncovered during the previous lookahead mode which originated from the same triggering instruction. Moreover, if no outer-level cache misses were uncovered during the previous lookahead mode which originated from the same triggering instruction, lookahead mode is not entered.

In some embodiments, the system determines that the lookahead mode is unlikely to uncover an additional outer-level cache miss after the lookahead mode executes the same number of instructions as were executed until a last outer-level cache miss was uncovered during a previous lookahead mode which originated from the same triggering instruction.

In some embodiments, the system determines that the lookahead mode is unlikely to uncover an additional outer-level cache miss after the lookahead mode encounters N branches, wherein the N branches were unresolvable because of data dependency problems and were predicted by a branch predictor with low confidence.

In some embodiments, the system treats strands in lookahead mode with lower priority than strands in normal-execution mode. For example, the system can allocate fewer resources to strands in lookahead mode as compared to strands in normal-operating mode. In another example, the system drops prefetch requests for strands in the lookahead mode before dropping prefetch requests for strands in the normal-operating mode.

BRIEF DESCRIPTION OF THE FIGURES

FIG. 7 presents a flow chart illustrating how the number of register windows can be limited for a strand executing in lookahead mode in accordance with the disclosed embodiments.

FIG. 8 presents a flow chart illustrating how lookahead mode can be terminated when it is determined lookahead mode is unlikely to uncover any additional outer-level cache misses in accordance with the disclosed embodiments.

FIG. 9 presents a flow chart illustrating how strands in lookahead mode can be treated with lower priority than strands in normal-execution mode in accordance with the disclosed embodiments.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Processor

Figure 1A:
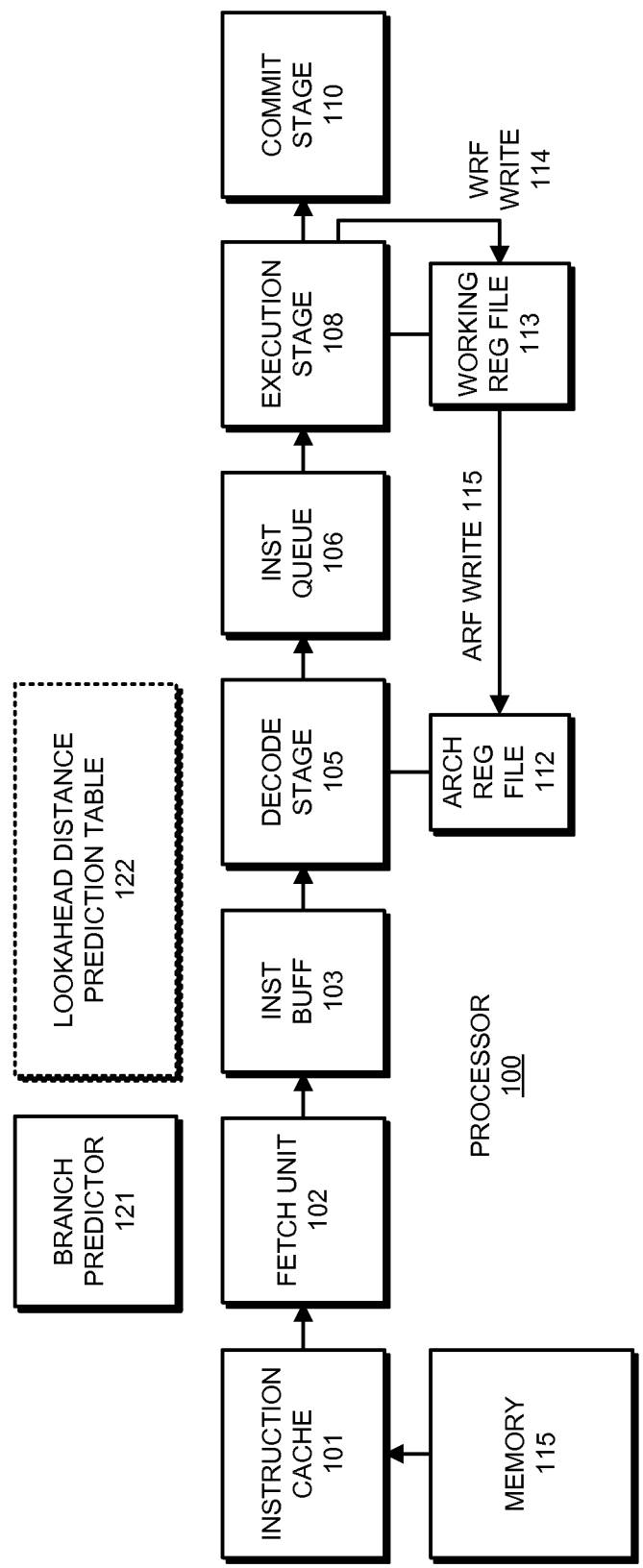
FIG. 1A illustrates a processor in accordance with the disclosed embodiments.

FIG. 1A illustrates the design of a processor 100 in accordance with an embodiment of the present invention. Processor 100 can generally include any type of processor, including, but not limited to, a microprocessor, a mainframe computer, a digital signal processor, a smartphone, a device controller and a computational engine within an appliance. As is illustrated in FIG. 1A, processor 100 includes a number of common processor structures, such as an instruction cache 101, a fetch unit 102, an instruction buffer 103, a decode stage 105, an instruction queue 106, an execution stage 108 and a commit stage 110. Also shown in FIG. 1A are a branch predictor 121 and a Lookahead Distance Prediction Table (LDPT) 122 which are described in more detail below with reference to FIGS. 8 and 9.

Processor 100 contains two local memory structures, Architectural Register File (ARF) 112 and Working Register File (WRF) 113, which hold values which are used while executing instructions within processor 100. ARF 112 generally holds the results of executed instructions which are committed into the architectural state of the processor. In general, ARF 112 is read during decode stage 105 and is written during commit stage 110. Specifically, at commit stage 110, the value from WRF 113 is copied to ARF 112. Note that ARF 112 is read during decode stage 105 because the read takes several clock cycles; reading ARF 112 later can cause unnecessary delays in processing instructions. (However, in other embodiments ARF 112 can alternatively be read during execution stage 108.)

WRF 113 holds intermediate results before they have been committed to ARF 112. WRF 113 is read during execution stage 108 and is designed to bypass a limited number of execution results back to execution stage 108 for consumption by subsequent instructions. Accesses to WRF 113 are fast. However, WRF 113 only holds enough results to cover the number of steps in execution stage 108. Note that instructions that do not receive their source operands from WRF 113 must read ARF 112.

During normal-execution mode, fetch unit 102 retrieves instructions to be executed from instruction cache 101, and feeds these instructions into instruction buffer 103. Instruction buffer 103 forwards the instructions to decode stage 105. From decode stage 105, the instructions pass to instruction queue 106, which feeds instructions into execution stage 108. If processor 100 is an "in-order processor" which supports in-order instruction execution, instruction queue 106 can be organized as a FIFO buffer. On the other hand, if processor 100 is an "out-of-order processor" which supports out-of-order execution, instruction queue 106 can be organized as a "pick queue." A pick queue generally contains entries for in-flight instructions. When the operands for an instruction ultimately become available, the instruction can be selected from the pick queue to be issued. Also note that an out-of-order processor is likely to do a good job of hiding latencies for L1 and L2 cache misses, which means that for an out-of-order processor the cache misses of interest for lookahead mode are likely to be L3 cache misses.

Keeping Track of Dependencies

Figure 1B:
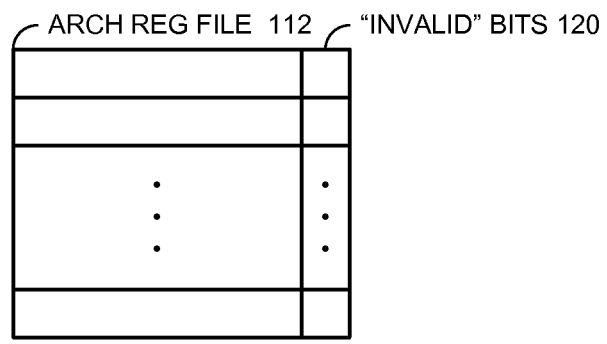
FIG. 1B illustrates an architectural register file in accordance with the disclosed embodiments.

The present invention keeps track of data dependencies to determine if an instruction is subject to an unresolved data dependency. In one embodiment, this can involve maintaining state information for each register, wherein the state information indicates whether or not a value in the register depends on an unresolved data dependency. For example, FIG. 1B illustrates the architectural register file (ARF) 112 in accordance with an embodiment of the present invention. Note that each register in ARF 112 is associated with an "invalid" bit 120, which keeps track of whether a valid operand value is contained in the register, or if the operand cannot be produced because of an unresolved data dependency. For example, if the register is waiting for an operand to return from a load operation, the corresponding invalid bit is set to indicate that the desired operand value is not present in the register. When a subsequent instruction references a source operand value that is marked as invalid, and generates a result that is stored in a destination register, the system marks the destination register as invalid to indicate that the value in the destination register also depends on the unresolved data dependency. This can be accomplished by marking the invalid bit of the destination register with the "OR" of the invalid bits for source registers of the instruction.

State Diagram

Figure 2:
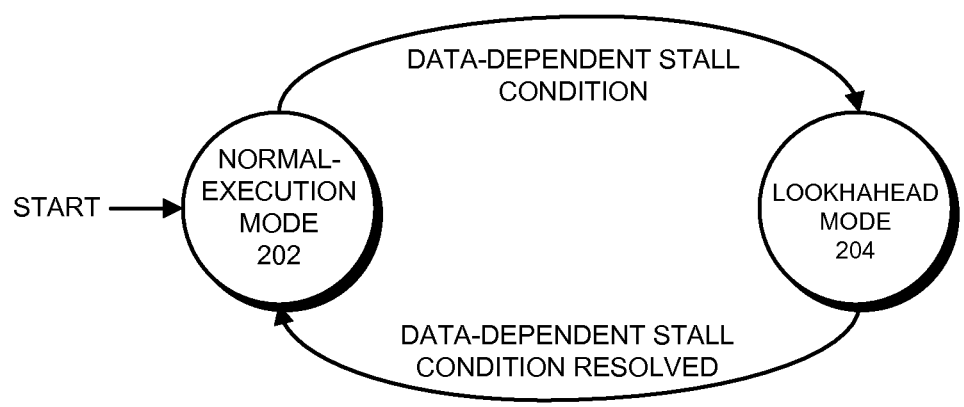
FIG. 2 illustrates possible operating modes for a strand in accordance with the disclosed embodiments.

FIG. 2 presents a state diagram which includes lookahead mode 204 in accordance with an embodiment of the present invention. The system starts in normal-execution mode 202, wherein instructions are executed as they are issued from instruction buffer 103 (see FIG. 1). If an unresolved data dependency arises during execution of an instruction, the system moves to lookahead mode 204. Note that an unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to lookahead mode 204, the system can optionally generate a checkpoint that can be used, if necessary, to return execution of the strand to the "triggering instruction" which caused the unresolved data dependency. (Note that generating the checkpoint involves saving the precise architectural state of the processor.) While operating in lookahead mode 204, the system executes instructions as they are received from instruction buffer 103.

When the unresolved data dependency caused by the triggering instruction is finally resolved, the system moves back into normal-execution mode 202. If a checkpoint was previously generated, the system uses the checkpoint to resume execution from the triggering instruction.

Reducing Hardware Costs

The hardware cost of checkpointing to support lookahead mode is proportional to the size of each checkpoint and to the number of concurrent checkpoints supported. Each checkpoint typically comprises the strand's register state as well as part of its branch predictor state (e.g., branch history register, return address stack pointer, etc.). Note that the register state is much larger than the branch predictor state, particularly for processor architectures with a large number of architectural registers. This disclosure describes a number of techniques which can be used to reduce the hardware cost of checkpointing by either reducing the size of each checkpoint or by reducing the number of concurrent checkpoints. These techniques may be used either in isolation or in combination.

Using the WRF to Communicate Operands between Lookahead Instructions

Many modern processors (such as SPARC processors) implement separate working registers and architectural registers. In such processors, an instruction writes the working register copy of its destination register during execution. Next, when the instruction retires, the value in the working register is copied to the corresponding architectural register and the working register is deallocated. In a conventional miss-lookahead system, because a checkpoint of the architectural registers is taken during the transition to lookahead mode, instructions in lookahead mode are allowed to modify the architectural registers when they retire. These architectural registers will be eventually returned to their original state when the checkpoint is restored prior to returning to normal-execution mode.

In some embodiments of the present invention, when a lookahead instruction retires, the value in the working register is not copied to the corresponding architectural register. Instead, the corresponding architectural register is marked as invalid. Subsequent instructions that read this architectural register (because there is no newer value in a working register) are converted to no-ops. When the strand exits lookahead mode, invalid bits in the architectural registers are cleared. Note that because the architectural registers are never modified by lookahead instructions, a checkpoint of the architectural registers is not required, which eliminates most of the hardware cost of a checkpoint. (Although note that system still checkpoints a small amount of state information, such as the program counter, the global history register for the branch predictor and the return address stack.)

In a variation of this technique, when an instruction from a strand in lookahead mode retires, it does not de-allocate the working register copy of its destination register. In this way, subsequent instructions reading this register can continue to obtain the up-to-date value from the working register copy. The working register is only de-allocated when a strand that is not in lookahead mode needs a working register and the working register file is full. At the time the working register is de-allocated, the architectural copy of the register is marked as invalid. This variation improves performance by reducing the frequency of an architectural register being marked as invalid and subsequent lookahead instructions dependent on the register being converted to no-ops. Although this technique is described in the context of a processor that implements separate working registers and architectural registers, this technique can also be adapted to work on a processor that unifies its working registers and architectural registers.

Figure 3:
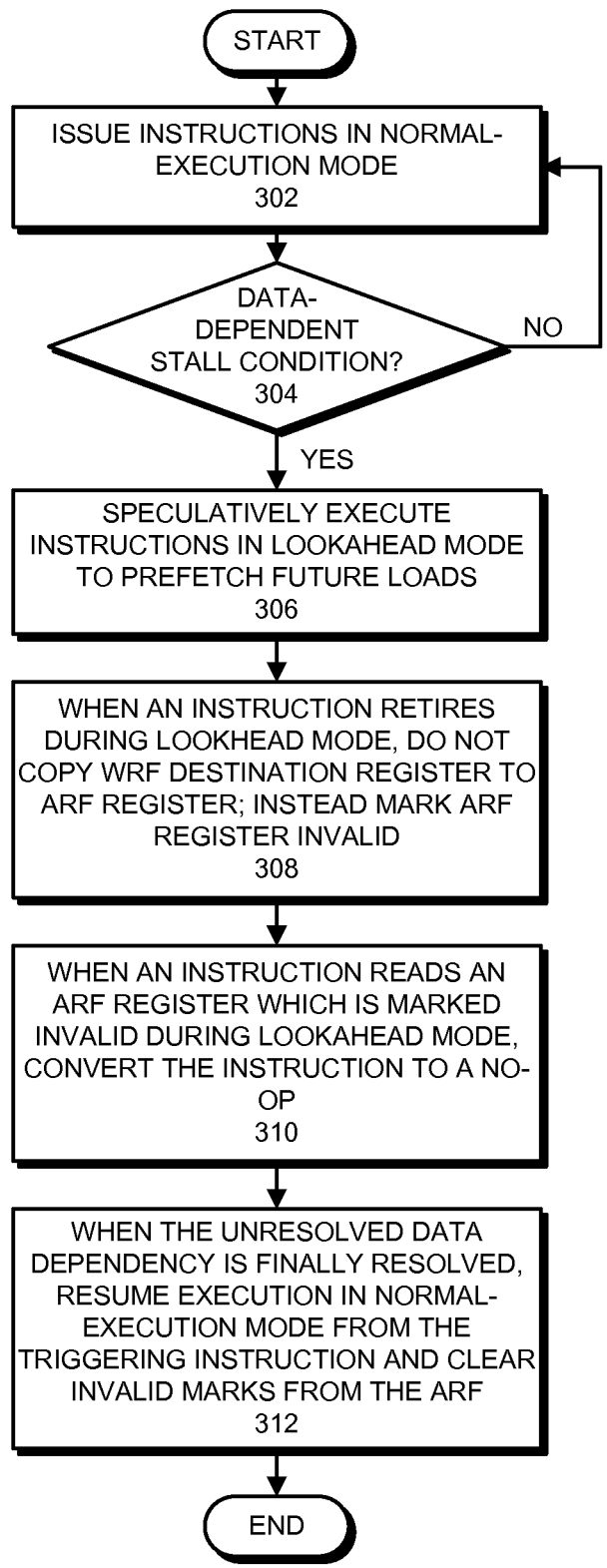
FIG. 3 presents a flow chart illustrating how updates to the architectural register file can be avoided during lookahead mode in accordance with the disclosed embodiments.

More specifically, FIG. 3 presents a flow chart illustrating how updates to the architectural register file can be avoided during lookahead mode in accordance with the disclosed embodiments. At the start of the process, the system issues instructions in a normal-execution mode (step 302). Next, the system determines whether an unresolved data dependency has caused a data-dependent stall condition (step 304). If not, the system returns to step 302 to issue additional instructions.

Otherwise, if there is a data dependent stall condition, the system speculatively executes subsequent instructions in lookahead mode to prefetch future loads (step 306). During lookahead mode, when an instruction retires, a working register which serves as a destination register for the instruction is not copied to an architectural register; instead the architectural register is marked as invalid (step 308). Also, when an instruction reads an architectural register which is marked invalid during the lookahead mode, the instruction is converted to a no-op (step 310). Next, when the unresolved data dependency that originally caused the system to move out of normal-execution mode is finally resolved, the system resumes execution in the normal-execution mode from the triggering instruction that caused the unresolved data dependency. The system also clears invalid marks from the architectural registers (step 312).

Not Checkpointing Floating-Point Registers

Figure 4:
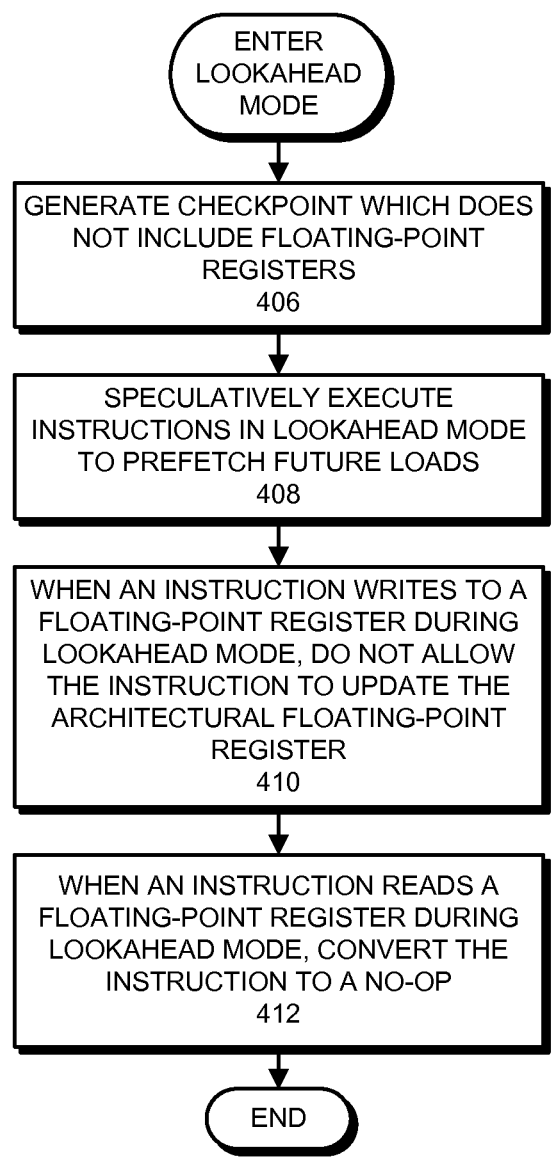
FIG. 4 presents a flow chart illustrating how a checkpoint can be generated without including floating-point registers in accordance with the disclosed embodiments.

Another way to reduce the cost of checkpointing is to not checkpoint floating-point registers. Referring to the flow chart illustrated in FIG. 4, when the system enters lookahead mode, the system generates a checkpoint, which excludes floating-point registers (step 406). Next, the system starts speculatively executing instructions to prefetch future loads (step 408). While executing in lookahead mode, instructions that write floating-point registers are not allowed to modify the architectural floating-point registers when they retire (step 410), and instructions that read floating-point registers are converted to no-ops (step 412). Note that floating-point instructions are generally not used for address computations to prefetch future loads. Hence, this technique reduces hardware costs without impacting the effectiveness of lookahead mode.

Limiting the Number of Strands in Lookahead Mode

Figure 5:
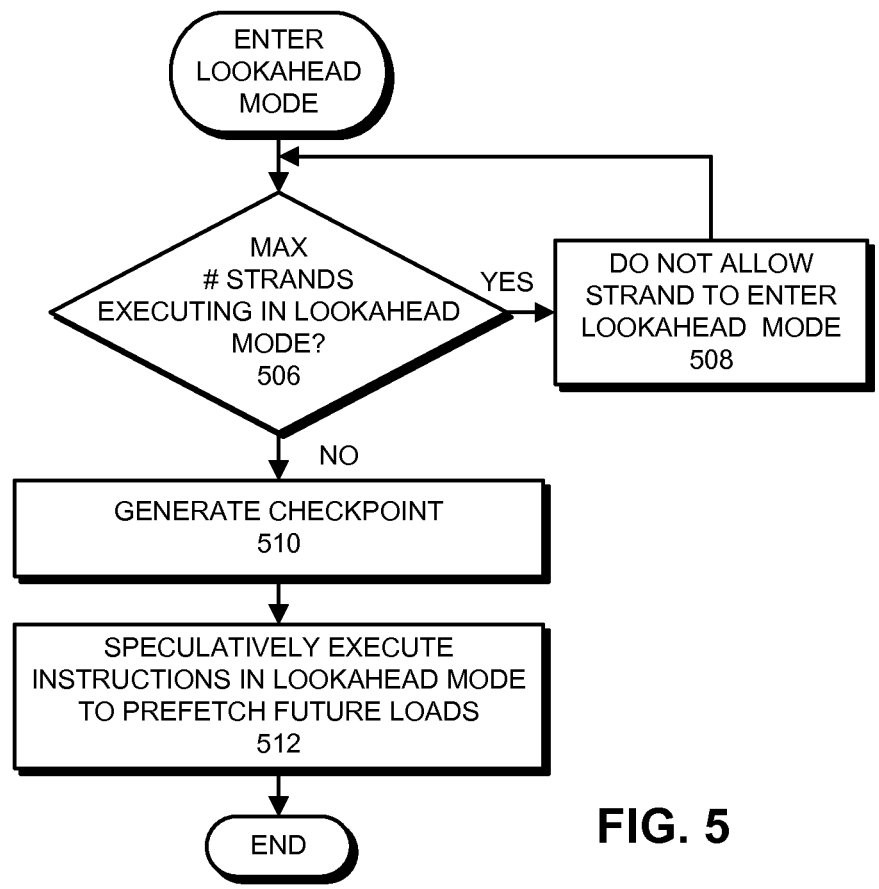
FIG. 5 presents a flow chart illustrating how the number of strands executing in lookahead mode can be limited in accordance with the disclosed embodiments.

The cost of checkpointing can also be reduced by imposing a limit on the number of strands in a core that can be in lookahead mode at any given time. This reduces that number of concurrent checkpoints that need to be supported. When this limit is reached, no more strands can enter lookahead mode until another strand exits lookahead mode and releases its checkpoint. For example, referring to the flow chart illustrated in FIG. 5, upon entering lookahead mode, the system determines whether a maximum number of strands are presently executing in a lookahead mode (step 506). If so, the system does not allow the current strand to enter the lookahead mode (step 508). Otherwise, the system allows the current strand to enter the lookahead mode which can involve generating a checkpoint (step 510) and speculatively executing instructions to prefetch future loads (step 512).

Saving Checkpointed Register Values to Memory

The cost of checkpointing can also be reduced by storing the checkpoint to system memory instead of a dedicated hardware structure. More specifically, referring to the flow chart in FIG. 6, upon entering lookahead mode, the system first generates a checkpoint by saving the architectural state of the strand to system memory instead of a dedicated hardware structure (step 606). Next, the system commences speculatively executing instructions to prefetch future loads (step 608). In this technique, generating the checkpoint involves sending a series of stores to memory via the cache hierarchy. For example, if the checkpoint is comprised of 32 registers, 32 stores will be sent out. In one embodiment, the memory locations which are being stored to correspond to locations on the stack of the strand in lookahead mode. In another embodiment, the memory locations correspond to a special area of memory reserved specifically for checkpointing. If this technique is used on a processor that supports register windows, only the registers corresponding to a current register window need to be stored to memory at the entry into lookahead mode. As new register windows are used while in lookahead mode, only then are the registers corresponding to those register windows stored to memory. When the checkpoint needs to be restored at the end of lookahead mode, the registers corresponding to all the register windows that have been used while in lookahead mode are recovered from memory via loads.

Limiting Register Windows in Lookahead Mode

Another way to reduce the cost of checkpointing is to impose a limit on the number of register windows a miss lookahead strand can use. When this limit is reached and the strand needs a new register window, lookahead mode is halted for that strand. More specifically, referring to the flow chart illustrated in FIG. 7, upon entering lookahead mode, the system first generates a checkpoint (step 706). Next, the system speculatively executes instructions to prefetch future loads. While in lookahead mode, if the strand attempts to exceed a maximum number of register windows, the system halts lookahead mode for the strand (step 708).

Reducing Power Consumption and Resource Usage

Because lookahead mode consumes power and potentially slows down other strands, it is desirable for lookahead mode to be halted when the likelihood of finding the next useful outermost-level cache miss is small. Moreover, because lookahead is speculative, it is preferably performed so that the likelihood of it slowing down other non-speculative strands is minimized. The disclosed embodiments provide a number of techniques that can be used either in isolation or in combination to achieve these objectives.

A number of techniques can be used to selectively halt lookahead mode. More specifically, referring to the flow chart illustrated in FIG. 8, upon entering lookahead mode, the system speculatively executes instructions to prefetch future loads (step 806). During lookahead mode, if the system determines that lookahead mode is unlikely to uncover additional outer-level cache misses, the system terminates lookahead mode (step 808).

In a first technique, the processor stops lookahead when the strand in lookahead mode has uncovered a certain number of outermost-level cache misses. This number is not fixed statically but is instead adjusted dynamically as the processor learns how many outermost-level cache misses it is likely to uncover when lookahead in initiated by a load instruction with a particular program counter (PC) value. In this technique, at the start of lookahead mode, the program counter (PC) value of the load instruction whose outermost-level cache miss triggered the strand's entry into lookahead mode is used to index a table called the Lookahead Distance Prediction Table (LDPT). (See Lookahead Distance Prediction Table 122 in FIG. 1). Each table entry comprises a tag and a value. On a tag match, if the value is zero, the strand does not enter lookahead mode because it is predicted that uncovering any outermost-level cache misses is unlikely. Otherwise, if the value is non-zero, the strand enters lookahead mode and subsequently exits lookahead mode either when the number of outermost-level cache misses it has uncovered is equal to this value, or when the cache miss request that triggered the entry into lookahead mode completes, whichever is earlier.

On a tag mismatch, the strand enters lookahead mode and subsequently exits lookahead mode when the cache miss request that triggered the entry into lookahead mode completes. In addition, the tag of the LDPT entry is changed to reflect the PC value of the load instruction that triggered this lookahead episode and the value of the entry is changed to reflect the number of outermost-level cache misses that were uncovered by this lookahead episode. While a simple table entry replacement technique has been described, other more-sophisticated replacement techniques, such as those that exploit hysteresis, can be used.

The LDPT can be implemented as a dedicated hardware structure, or it can be implemented as an augmentation of the instruction caches. In the latter implementation, to reduce hardware storage requirements, instead of using the PC value of the triggering load instruction to index the LDPT, the instruction cache line address corresponding to that PC may be used instead. In this way, only one LDPT entry is needed for each instruction cache line. Moreover, the tag for the instruction cache line also acts as the tag for the LDPT entry, further reducing storage requirements. Assuming the value field of an entry is three bits and the instruction cache comprises 8K lines (e.g., a 512 KB level two instruction cache with a 64 B line size), the hardware storage requirement of the LDPT is only 3 KB. A potential drawback of this cache-based implementation is aliasing due to the existence of more than one triggering load in the same instruction cache line.

In an alternative embodiment, the value field of an LDPT entry indicates the maximum number of lookahead instructions that should be processed during that lookahead episode. On a tag match, lookahead is stopped when the strand in lookahead mode has processed that many lookahead instructions. On a tag mismatch, whenever lookahead mode uncovers an outermost-level cache miss, a register called the Lookahead Distance Register (LDR) is updated with the number of lookahead instructions processed so far in the current lookahead episode. At the end of lookahead mode, the value of the LDR indicates when lookahead should have been stopped since the subsequent instructions did not uncover any additional outermost-level cache misses. The value of this register is copied to the value field of the corresponding LDPT entry.

In yet another embodiment, the processor stops lookahead when the strand in lookahead mode has encountered N unresolvable branches that were considered by the branch predictor (see branch predictor 121 in FIG. 1) to have been predicted with low confidence. These branches are unresolvable because they are data dependent on one or more load instructions that were outermost-level cache misses. Note that a confidence value for a branch prediction is provided by some types of branch predictors. Also note that the values of N and the low confidence threshold are design parameters.

In another embodiment, while speculatively executing instructions in lookahead mode, the processor can treat instructions belonging to a strand in lookahead mode as lower priority than instructions from strands not in lookahead mode. (See step 906 of the flow chart illustrated in FIG. 9.) For example, the processor can prevent a strand in lookahead mode from acquiring any more "pick queue" entries (in an out-of-order processor) when this strand is currently using more than a predetermined number of pick queue entries. In another example, the L2 cache and/or the L3 cache treat requests from a strand in lookahead mode as lower priority than requests from strands not in lookahead mode. More specifically, if the cache implements prefetch dropping, requests from a strand in lookahead mode may be dropped ahead of requests from strands not in lookahead mode.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for executing program instructions on a processor, comprising:
   issuing instructions for execution during a normal-execution mode;
   upon encountering a triggering instruction which causes an unresolved data dependency, speculatively executing subsequent instructions in a lookahead mode to prefetch future load; and
   when the processor determines that the lookahead mode is unlikely to uncover an additional outer-level cache miss, terminating the lookahead mode and recommencing execution at the triggering instruction in the normal-execution mode after the unresolved data dependency is resolved, wherein the processor determines that the lookahead mode is unlikely to uncover an additional outer-level cache miss based on at least one of:
      determining that the lookahead mode uncovers the same number of cache misses as were uncovered during a previous lookahead mode which originated from the same triggering instruction;
      determining that the lookahead mode executes the same number of instructions as were executed until a last outer-level cache miss was uncovered during the previous lookahead mode; and
      determining that the lookahead mode encounters N branches,
   wherein the N branches were unresolvable because of data dependency problems and were predicted by a branch predictor with low confidence.

2. The method of claim 1, wherein the processor uses a program counter for the triggering instruction to perform a table lookup to determine the number of cache misses which were uncovered during the previous lookahead mode which originated from the same triggering instruction.

3. The method of claim 1, wherein if no outer-level cache misses were uncovered during the previous lookahead mode which originated from the same triggering instruction, the lookahead mode is not entered.

4. The method of claim 1, wherein the processor uses a program counter for the triggering instruction to perform a table lookup to determine the number of instructions which were executed until a last outer-level cache miss was uncovered during a previous lookahead mode which originated from the same triggering instruction.

5. The method of claim 1, wherein if no outer-level cache misses were uncovered during the previous lookahead mode which originated from the same triggering instruction, the lookahead mode is not entered.

6. The method of claim 1, wherein prior to speculatively executing the instructions in the lookahead mode, the method further comprises generating a checkpoint that can subsequently be used to return execution of the program to the point of the triggering instruction.

7. The method of claim 1, wherein when the unresolved data dependency that originally caused the system to move out of normal-execution mode is finally resolved, the method further comprises resuming execution in the normal-execution mode from the triggering instruction.

8. The method of claim 1, wherein the unresolved data dependency can include:
   a use of an operand that has not returned from a preceding load miss;
   a use of an operand that has not returned from a preceding translation lookaside buffer (TLB) miss;
   a use of an operand that has not returned from a preceding full or partial read-after-write (RAW) from store buffer operation; and
   a use of an operand that depends on another operand that is subject to an unresolved data dependency.

9. An apparatus that executes program instructions, comprising:
   an execution mechanism configured to issue instructions for execution during a normal-execution mode; and
   a detection mechanism configured to detect an unresolved data dependency;
   wherein if an unresolved data dependency is detected during execution of a triggering instruction by a strand, the execution mechanism is configured to speculatively execute subsequent instructions in a lookahead mode to prefetch future loads; and
   wherein if the execution mechanism determines that the lookahead mode is unlikely to uncover an additional outer-level cache miss, the execution mechanism is configured to terminate the lookahead mode and recommence execution at the triggering instruction in the normal-execution mode after the unresolved data dependency is resolved, wherein the execution mechanism determines that the lookahead mode is unlikely to uncover an additional outer-level cache miss based on at least one of:
      determining that the lookahead mode uncovers the same number of cache misses as were uncovered during a previous lookahead mode which originated from the same triggering instruction;
      determining that the lookahead mode executes the same number of instructions as were executed until a last outer-level cache miss was uncovered during the previous lookahead mode; and
      determining that the lookahead mode encounters N branches, wherein the N branches were unresolvable because of data dependency problems and were predicted by a branch predictor with low confidence.

10. The apparatus of claim 9, wherein the execution mechanism is configured to use a program counter for the triggering instruction to perform a table lookup to determine the number of cache misses which were uncovered during the previous lookahead mode which originated from the same triggering instruction.

11. The apparatus of claim 9, wherein if no outer-level cache misses were uncovered during the previous lookahead mode which originated from the same triggering instruction, the strand does not enter the lookahead mode.

12. The apparatus of claim 9, wherein the execution mechanism is configured to use a program counter for the triggering instruction to perform a table lookup to determine the number of instructions which were executed until a last outer-level cache miss was uncovered during a previous lookahead mode which originated from the same triggering instruction.

13. The apparatus of claim 9, wherein if no outer-level cache misses were uncovered during the previous lookahead mode which originated from the same triggering instruction, the strand does not enter the lookahead mode.

14. The apparatus of claim 9, wherein prior to speculatively executing the instructions in the lookahead mode, the execution mechanism is configured to generate a checkpoint that can subsequently be used to return execution of the program to the point of the triggering instruction.

15. The apparatus of claim 9, wherein when the unresolved data dependency that originally caused the system to move out of normal-execution mode is finally resolved, the execution mechanism is configured to resume execution in the normal-execution mode from the triggering instruction.

16. A method for executing program instructions on a processor, comprising:
   issuing instructions for execution during a normal-execution mode;
   upon encountering a triggering instruction which causes an unresolved data dependency, speculatively executing subsequent instructions in a lookahead mode to prefetch future loads; and
   wherein the processor treats strands in the lookahead mode with lower priority than strands in the normal-execution mode by at least of:
      allocating fewer resources to strands in the lookahead mode as compared to strands in the normal-operating mode; and
      dropping prefetch requests for strands in the lookahead mode before dropping prefetch requests for strands in the normal-operating mode.

17. The method of claim 16, wherein allocating fewer resources to strands in the lookahead mode as compared to strands in the normal-operating mode involves limiting a strand in the lookahead mode to using fewer pick queue entries than a strand in the normal-operating mode.

18. An apparatus that executes program instructions, comprising:
   an execution mechanism configured to issue instructions for execution during a normal-execution mode; and
   a detection mechanism configured to detect an unresolved data dependency;
   wherein if an unresolved data dependency is detected during execution of a triggering instruction by a strand, the execution mechanism is configured to speculatively execute subsequent instructions in a lookahead mode to prefetch future loads; and
   wherein the execution mechanism is configured to treat strands in the lookahead mode with lower priority than strands in the normal-execution mode by at least one of:
      allocating fewer resources to strands in the lookahead mode as compared to strands in the normal-operating mode;
      dropping prefetch requests for strands in the lookahead mode before dropping prefetch requests for strands in the normal-operating mode.

19. The apparatus of claim 18, wherein allocating fewer resources to strands in the lookahead mode as compared to strands in the normal-operating mode involves limiting a strand in the lookahead mode to using fewer pick queue entries than a strand in the normal-operating mode.

* * * * *

UNITED STATES PATENT AND TRADEMARK OFFICE
CERTIFICATE OF CORRECTION

PATENT NO. : 9,009,449 B2  
APPLICATION NO. : 13/293733  
DATED : April 14, 2015  
INVENTOR(S) : Yuan C. Chou et al.

Page 1 of 1

It is certified that error appears in the above-identified patent and that said Letters Patent is hereby corrected as shown below:

In the Drawings

In FIG. 2 (at sheet 2 of 6, reference numeral 204), delete the term "LOOKHAHEAD" and replace it as follows:
-- LOOKAHEAD --

In FIG. 3 (at sheet 3 of 6, reference numeral 308), delete the term "LOOKHEAD" and replace it as follows:
-- LOOKAHEAD --

Figure 6:
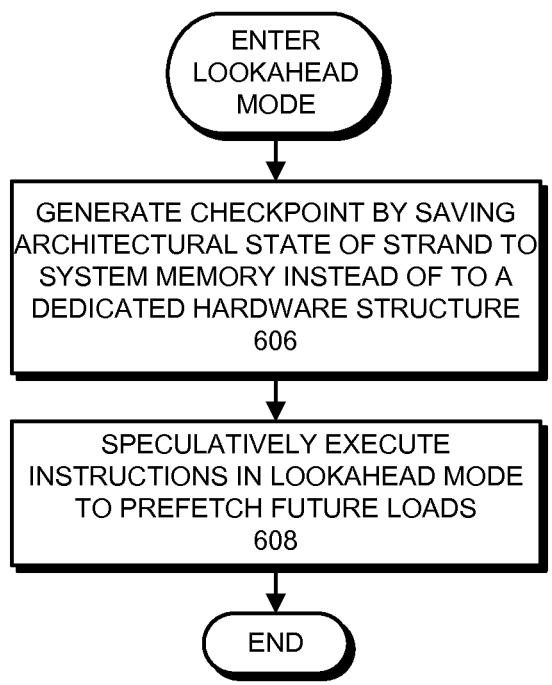
FIG. 6 presents a flow chart illustrating how a checkpoint can be saved to system memory instead of a dedicated hardware structure in accordance with the disclosed embodiments.

In FIG. 6 (at sheet 5 of 6, reference numeral 606), delete the words "OF TO A" and replace with the words:
-- OF A --

In the Specification

At column 7, line 20, delete the word "deallocated." and replace it with the word: -- de-allocated. --

Signed and Sealed this
Twelfth Day of April, 2016

Michelle K. Lee
*Director of the United States Patent and Trademark Office*